United States Patent Office 3,835,112
Patented Sept. 10, 1974

3,835,112
HEPARIN ESTERS
Jean Mardiguian and Pierre Fournier, Paris, France, assignors to Societe a Responsabilite Limitee dite: Societe d'Etude et d'Exploitation de Marques Mar-Pha, Paris, France
Filed June 7, 1971, Ser. No. 150,293
Claims priority, application Great Britain, June 8, 1970, 27,687/70
Int. Cl. C08b 19/03
U.S. Cl. 260—211 R                10 Claims

ABSTRACT OF THE DISCLOSURE

Partial hydrolysable esters of heparin and an organic, non-toxic, physiologically tolerated acid. Said esters can be used, *inter alia*, as anti-coagulants having a delayed effect, hypo-lipemic agents, and hypocholesterolemic agents.

---

Figure 1:
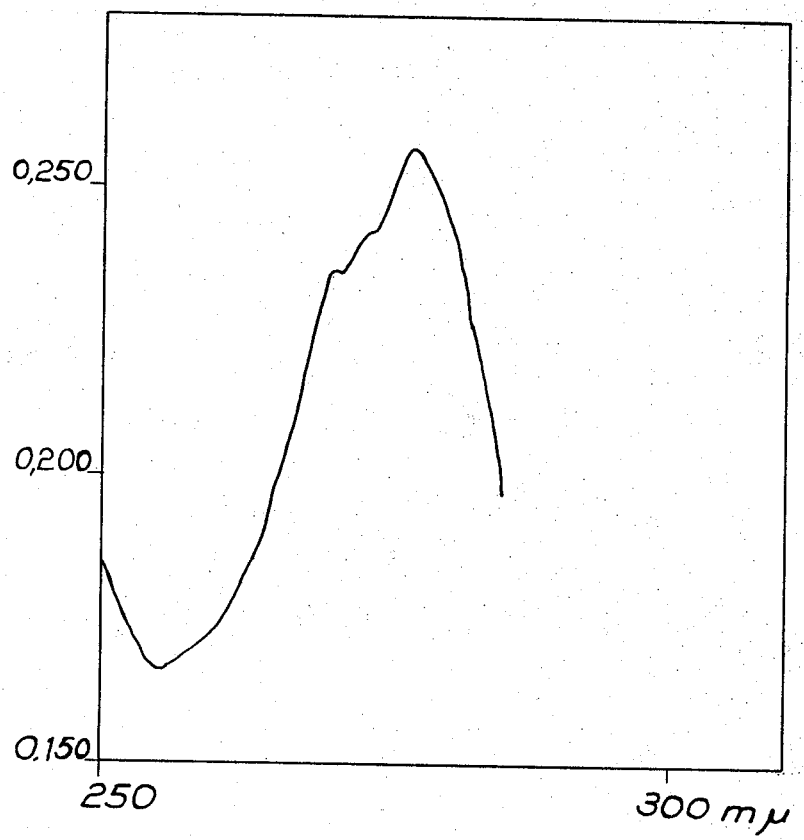

Heparin is a polysaccharide consisting of units of α-D-glucuronic acid and of 2-amino-2-desoxy-α-D-glucose, linked by 1,4-bonds and containing sulphate ester groupings. It is a natural substance which can be extracted from various tissues of mammals, and which has been used in medicine for about 30 years, principally for its action on the coagulation of blood and the metabolism of lipids.

However, it suffers from the disadvantage of being very rapidly eliminated from the organism and hence requires administration either by continuous venous perfusion or by intramuscular or subcutaneous injection to ensure a constant level in the blood, and in this case its high anti-coagulant activity frequently causes the formation of major haematomas.

The present invention provides partial esters of heparin with non-toxic physiologically tolerated organic acids which either are therapeutically inactive or have a therapeutic action of their own which is independent of the anti-coagulant activity of heparin.

These new esters have a very low anti-coagulant activity compared with heparin, but the anti-coagulant activity can be gradually but completely restored by enzymatic hydrolysis or hydrolysis in the body.

Furthermore, by using certain long-chain fatty acids for esterifying the heparin it is possible to modify the conditions of absorption of heparin in the body.

The invention more particularly provides monoesters of heparin with organic non-toxic physiologically tolerated acids, preferably chosen from the group comprising:

(a) acids which themselves have an action on the metabolism of lipids, for example 4-chlorophenoxy-isobutyric acid, 4-chlorophenoxy acetic acid, cholic acid, nicotinic acid, N-oxy-nicotinic acid, pyridylacetic acid, and N-oxy-pyridylacetic acid;
(b) fatty acids having at least 16 carbon atoms capable of yielding lipid-soluble esters of heparin which can be administered orally, for example linoleic acid, or α-sulphopalmitic acid; and
(c) aminoacids capable of giving rise to labile easily hydrolysable esters of heparin.

In these monoesters the heparin can be present in the form of a salt, with, e.g., an alkali metal, magnesium, calcium, a non-toxic amine, or a non-toxic quaternary ammonium base.

The invention also provides a process for the preparation of partial esters, of heparin as defined above which comprises contacting a quaternary ammonium salt of heparin, at a temperature less than or equal to 0° C., with a large excess of an organic acid such as defined above in the presence of a carbo-diimide dehydrating agent, especially dicyclohexyl-carbodiimide or di-p-nitrophenyl-carbodiimide, in an anhydrous non-hydroxylic organic solvent, especially methylene chloride, chloroform, acetone, diethyl ether, dimethyl-formamide, tetrahydrofuran, or dioxane.

The esterification is mild and may affect a maximum of only one or several hydroxyl groups in each tetrasaccharide unit of heparin:

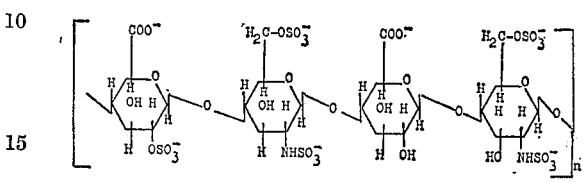

where n=10 to 15, without causing depolymerisation or desulphatation at the nitrogen in the heparin molecule.

Furthermore, the anti-coagulant activity of the esters obtained is a function of the degree of esterification; their toxicity is of the same order as that of heparin, as well as their anti-coagulating activity, but they have in addition a delay effect. Thus it is possible, by varying the degree of esterification, to obtain a heparin ester which to a greater or lesser extent is deprived of anticoagulant activity *in vitro*.

This anti-coagulant activity is gradually restored by hydrolysis in the body, as is demonstrated by the controlled saponification experiments described in the Examples which follow. Consequently, the heparin esters of the invention can be used, *inter alia*, as anti-coagulants having a delayed effect, hypo-lipemic agents, and hypo-cholesterolemic agents.

The following Examples illustrate the invention.

EXAMPLE 1

Ester of heparin with 4-chlorophenoxy-isobutyric acid

A solution of 12.5 g. of dicyclohexyl-carbodiimide, as dehydrating agent, in 50 ml. of anhydrous methylene chloride is added to a solution of 5.16 g. of the heparin salt of hyamine 1622 (benzethonium chloride manufactured by Messrs. Rohm and Haas) in 50 ml. of anhydrous methylene chloride, cooled with an ice bath. A solution of 13 g. of p-chlorophenoxy-isobutyric acid in 80 ml. of anhydrous methylene chloride is added slowly to the solution obtained, cooled in an ice bath and kept under an atmosphere of nitrogen. The addition takes about 45 minutes and the reaction medium is kept at 0° C. The mixture is left in a refrigerator for 48 hours.

After filtering to remove the precipitate of urea, the filtrate is evaporated *in vacuo* at ambient temperature. The resulting residue is taken up in diethyl ether. The mixture is filtered, and the insoluble material is washed with diethyl ether and then dried *in vacuo* to yield the 4-chlorophenoxy-isobutyrate ester of the heparin salt of hyamine.

In order to obtain the water-soluble sodium salt, 10 g. of the product obtained are dissolved in 84 ml. of 95% ethyl alcohol and 20 ml. of a 16.75% solution of sodium acetate are added. The precipitate is filtered off, washed with 95% ethyl alcohol and dried *in vacuo*.

1.03 g. of the 4-chlorophenoxy-isobutyrate ester of sodium heparinate are thus obtained. Analysis gives nitrogen=1.73%, sulphur=12%, and chloride=3.15%. The corresponding values calculated for the complete esterification of one hydroxyl group in each tetrasaccharide unit of heparin are as follows: nitrogen=1.96%, sulphur=11.18%, chlorine=2.5%; the ultraviolet absorption (FIG. 1 of the accompanying drawings) shows spectrum with 3 maxima at 270, 273 and 277 m$\mu$;

$E_{1cm}^{1\%} = 10.16$ at 277 m$\mu$ (in water).

Figure 2:
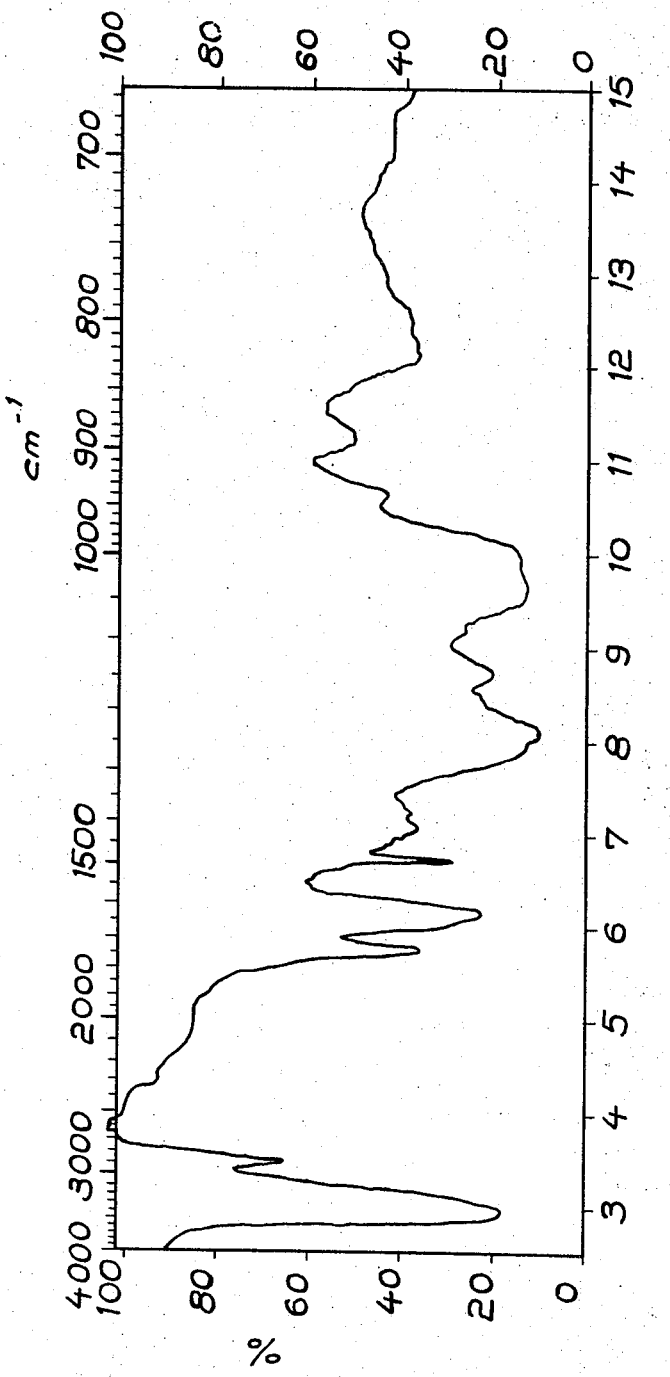

FIG. 2 shows the infrared spectrum with a band characteristic of the ester group at 5.8$\mu$.

The anti-coagulant activity is 16.5 I.U./mg. (as against 130 L.U./mg. for the sodium salt of heparin).

Saponification 0.484 g. of ester prepared above are gradually dissolved by stirring in 20 ml. of N sodium hydroxide, under a nitrogen atmosphere, in an ice bath at 0° C. After two hours' reaction, the heparin salt of hyamine is precipitated by adding 10 ml. of a 10% aqueous solution of hyamine. The precipitate is collected by decantation, washed with water and then dissolved in 27.5 ml. of 95% ethyl alcohol. 6.7 ml. of 15% sodium acetate are slowly added to precipitate the sodium salt of heparin, which is dried in vacuo over phosphorus pentoxide. 0.285 g. of a product containing 75 I.U. of anti-coagulant activity per mg. (against 16.5 I.U./mg. for the starting ester) are thus obtained. The characteristic anti-coagulant activity of heparin is thus restored by hydrolysis of the ester.

EXAMPLE 2

Ester of heparin with linoleic acid 5.15 g. of dicyclohexyl-carbodiimide dissolved in 20 ml. of anhydrous methylene chloride are added to a solution of 2.13 g. of the heparin salt of hyamine 1622 in 30 ml. of anhydrous methylene chloride, cooled by a bath of ice and salt. When the resulting solution has been cooled to —10° C., and placed under an atmosphere of nitrogen, a solution of 7 g. of linoleic acid in 15 ml. of anhydrous methylene chloride is added dropwise. The addition takes 2 hours and 20 minutes. The mixture is stirred for a further hour and the flask, kept constantly under nitrogen is placed in a refrigerator for 48 hours.

The resulting precipitate is filtered off and the filtrate is evaporated in vacuo at ambient temperature. The pasty residue is taken up in diethyl ether. The mixture is filtered, and the insoluble matter is washed with diethyl ether and then dried in vacuo. 2.32 g. of the linoleated ester of the heparin salt of hyamine are thus obtained.

The water-soluble sodium salt is obtained as follows: 6 ml. of a 16.6% sodium acetate solution are added to 1 g. of ester prepared above, dissolved in 25 ml. of 95% ethyl alcohol. The mixture is allowed to precipitate for three hours and the precipitate is then filtered off, washed with 20 ml. of 95% ethyl alcohol and dried in vacuo over phosphorus pentoxide.

Figure 3:
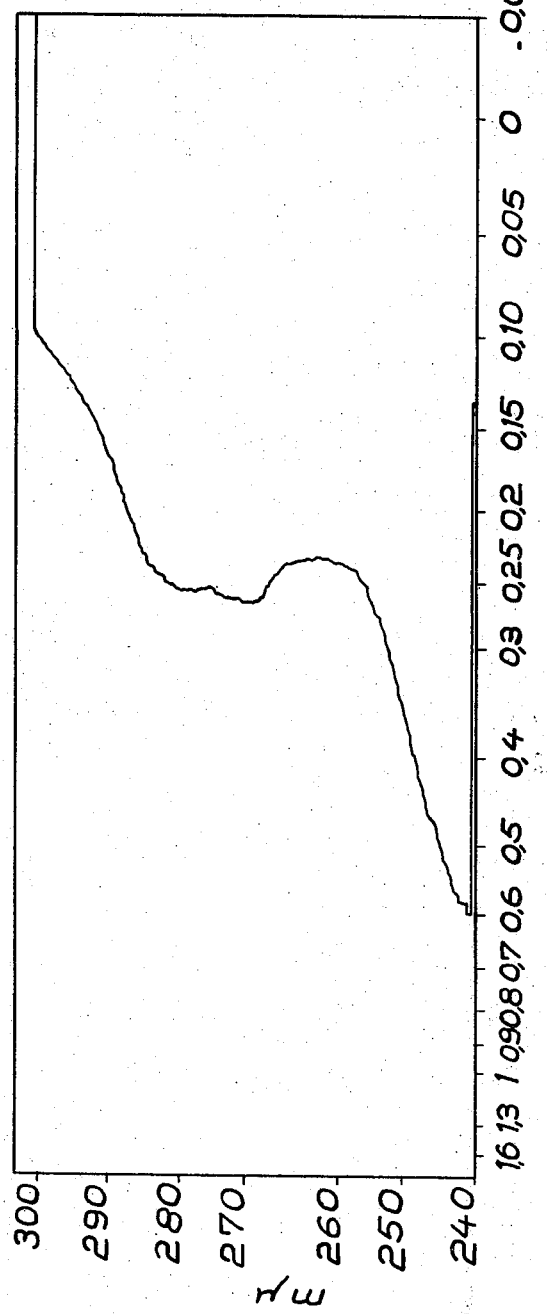
Figure 4:
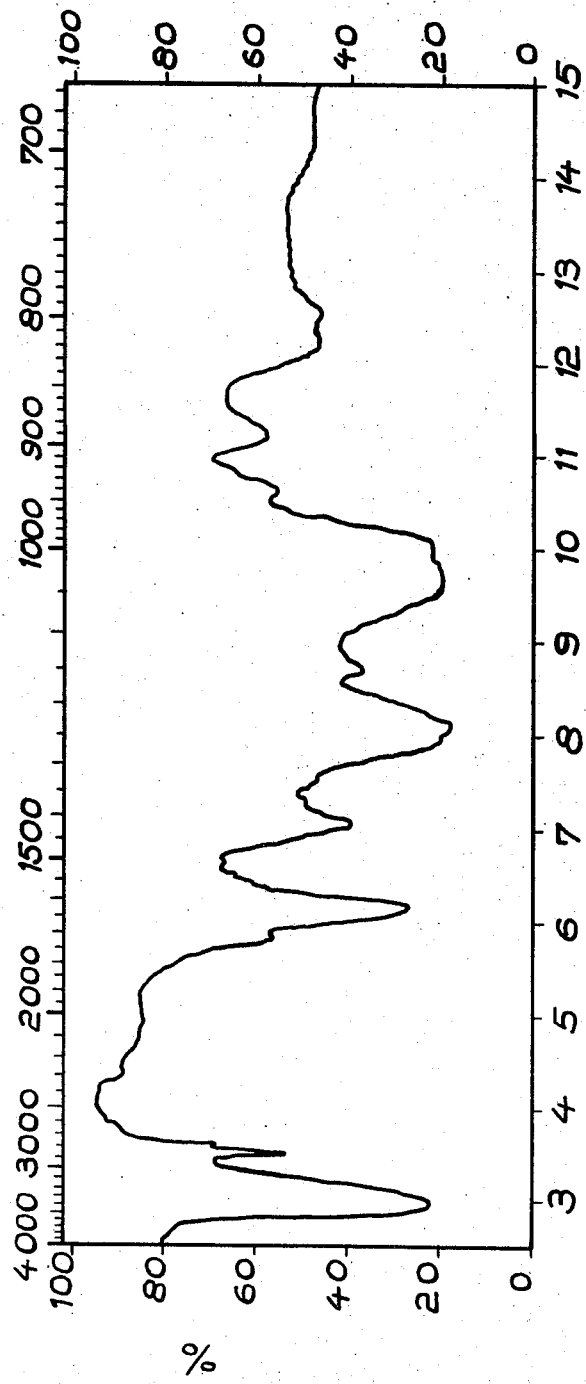

0.330 g. of the linoleate ester of sodium heparinate is thus obtained. Its analysis is as follows: sulphur=10.65%, nitrogen=1.82%, and the atomic ratio $S:N$ is 2.55. The ultraviolet spectrum which has a maximum at about 260 m$\mu$, is shown in FIG. 3. The infrared spectrum, which has an ester band at 5.8$\mu$, is shown in FIG. 4. The anti-coagulant activity is 15 I.U./mg. (compared with 130 I.U./mg. for the sodium salt of heparin).

Saponification 0.424 g. of ester prepared above is gradually dissolved by stirring in 18 ml. of N sodium hydroxide, the process being carried out under a nitrogen atmosphere in a cooling bath at 0° C. After two hours' reaction, the heparin salt of hyamine is precipitated by adding 8.75 ml. of a 10% aqueous solution of hyamine. The precipitate is collected by decantation, washed with water and then dissolved in 50 ml. of 95% ethyl alcohol. 4 ml. of 25% sodium acetate solution are slowly added to precipitate the sodium salt of heparin, which is dried in vacuo over phosphorus pentoxide. 0.403 g. of a product containing 115 I.U./mg. of anti-coagulant activity (against 15 I.U./mg. for the starting ester) is thus obtained. The characteristic anti-coagulant activity of heparin is thus restored by hydrolysis of the ester.

The pharmacological properties of the esters of heparin according to the invention are shown by measuring the coagulation time, after administration of said esters to a 3.5 kg. rabbit.

I.V. ADMINISTRATION

Ester of heparin and 4-chlorophenoxy isobutyric acid (Example 1), Dose: 200 I.U./kg.

Figure 5:
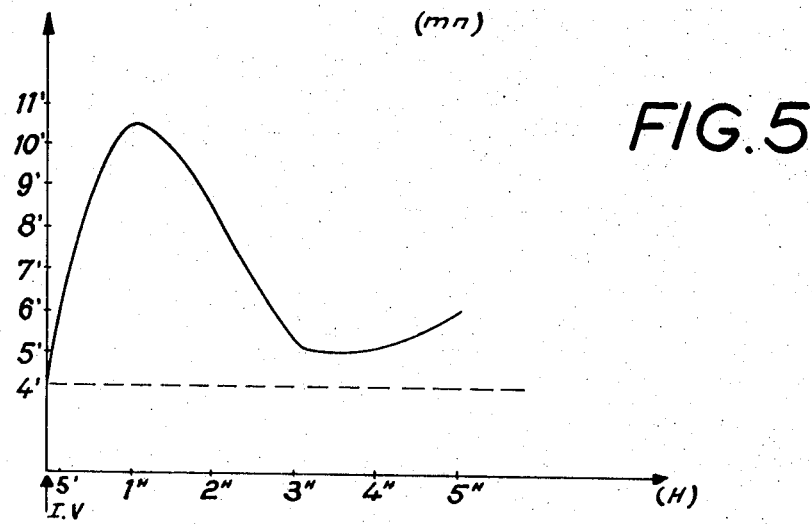

A maximum action is noted at the end of one hour with extension beyond 4 hours [curve of FIG. 5, giving the coagulation time in minutes (on the $x$-axis) as a function of the time after injection in hours (on the $y$-axis)].

I.M. ADMINISTRATION

Ester of heparin and linoleic acid (Example 2), Dose: 800 I.U./kg.

Figure 6:
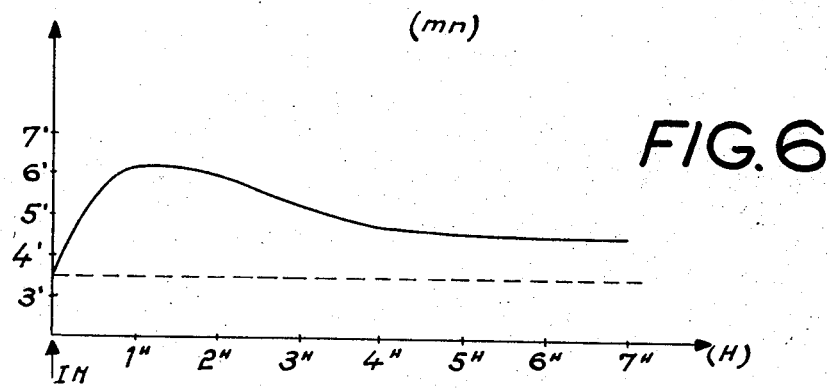

Maximum action after 2 hours with an extension beyond 7 hours (curve of FIG. 6.)

S.C. ADMINISTRATION

Product of Example 2: 400 I.U./kg.
Associated with sodium heparinate: 400 I.U./kg.

Figure 7:
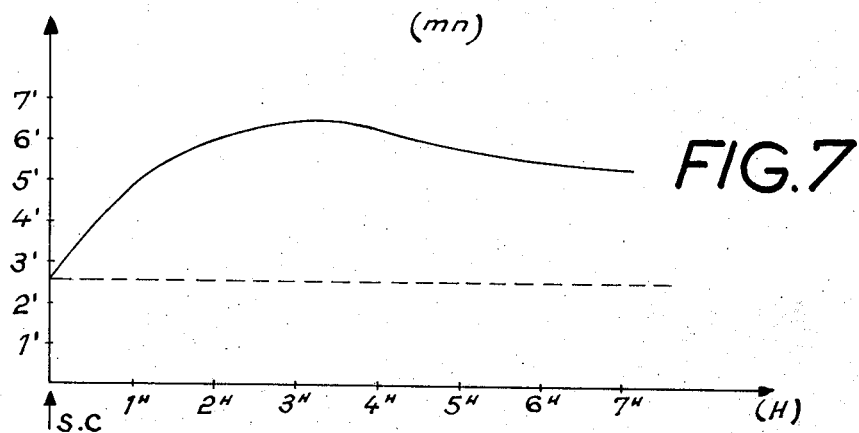

Maximum action after 4 hours with still considerable effect at the end of 7 hours (curve of FIG. 7).

In all cases:

the esters of heparin have a more prolonged action than that of heparin;
they do not provoke hematoma.

They may be administered alone or in association with heparin.

We claim:

1. Partial hydrolysable esters of heparin and an organic, non-toxic, physiologically tolerated acid of the group consisting of 4-chlorophenoxy-isobutyric acid, 4-chlorophenoxy acetic acid, cholic acid, nicotinic acid, N-oxy-nicotinic acid, pyridylacetic acid, N-oxy-pyridylacetic acid, fatty acids having at least 16 carbon atoms and capable of yielding lipid-soluble esters of heparin wherein the esters are formed by esterification of one or several of the hydroxyl groups of heparin.

2. Monoesters of heparin and an organic, non-toxic physiologically tolerated acid of the group consisting of 4-chlorophenoxy-isobutyric acid, 4-chlorophenoxy acetic acid, cholic acid, nicotinic acid, N-oxy-nicotinic acid, pyridylacetic acid, N-oxy-pyridylacetic acid, fatty acids having at least 16 carbon atoms and capable of yielding lipid-soluble esters of heparin wherein the esters are formed by esterification of one or more of the hydroxyl groups of heparin.

3. Partial esters of heparin as claimed in claim 1, wherein the organic acid is selected from the group consisting of:
   (a) acids which themselves have an action on the metabolism of lipids, of the group consisting of 4-chlorophenoxy-isobutyric acid, 4 - chlorophenoxy acetic acid, cholic acid, nicotinic acid, N-oxy-nicotinic acid, pyridylacetic acid, and N-oxy-pyridylacetic acid;
   (b) fatty acids having at least 16 carbon atoms capable of yielding lipid-soluble esters of heparin which can be administered orally, of the group consisting of linoleic acid and $\alpha$-sulphopalmitic acid.

4. Partial esters of heparin according to Claim 1, wherein the heparin is in the form of a free base or of a salt of alkali metal, magnesium, calcium, amine or quaternary ammonium.

5. Ester of heparin and 4-chlorophenoxy isobutyric acid.

6. Ester of heparin and linoleic acid.

7. Process of preparation of partial hydrolysable esters of heparin and an organic, non-toxic, physiologically tolerated acid of the group consisting of 4-chlorophenoxy-isobutyric acid, 4-chlorophenoxy acetic acid, cholic acid, nicotinic acid, N-oxy-nicotinic acid, pyridylacetic acid, N-oxy-pyridylacetic acid, fatty acids having at least 16 carbon atoms and capable of yielding lipid-soluble esters of heparin wherein a quaternary ammonium salt of heparin is contacted with a large excess of the organic acid, at a temperature lower than or equal to 0° C., in the presence of a dehydrating agent of the carbodiimides series, in an anhydrous non-hydroxylic organic solvent.

8. Process as claimed in claim 7, wherein the organic acid is selected from the group consisting of:
   (a) acids which themselves have an action on the metabolism of lipids, of the group consisting of 4-chlorophenoxy-isobutyric acid, 4-chloro-phenoxy acetic acid, cholic acid, nicotinic acid, N-oxy-nicotinic acid, pyridylacetic acid, and N-oxy-pyridylacetic acid;
   (b) fatty acids having at least 16 carbon atoms capable of yielding lipid-soluble esters of heparin which can be administered orally, of the group consisting of linoleic acid and α-sulphopalmitic acid.

9. Partial esters of heparin as claimed in claim 2, wherein the organic acid is selected from the group consisting of:
   (a) acids which themselves have an action on the metabolism of lipids, of the group consisting of 4-chlorophenoxy-isobutyric acid, 4 - chlorophenoxy acetic acid, cholic acid, nicotinic acid, N-oxy-nicotinic acid, pyridylacetic acid, and N-oxy-pyridylacetic acid;
   (b) fatty acids having at least 16 carbon atoms capable of yielding lipid-soluble esters of heparin which can be administered orally, of the group consisting of linoleic acid and α-sulphopalmitic acid.

10. Partial esters of heparin according to Claim 2, wherein the heparin is in the form of a free base or of a salt of alkali metal, magnesium, calcium, amine or quaternary ammonium.

References Cited

UNITED STATES PATENTS

| | | | |
|---|---|---|---|
| 3,065,140 | 11/1962 | Velluz et al. | 260—211 R |
| 3,118,816 | 1/1964 | Cushing | 260—211 R |
| 3,207,665 | 9/1965 | Bucourt | 260—211 R |
| 3,232,838 | 2/1966 | Nomine et al. | 260—211 R |
| 3,478,015 | 11/1969 | Onishi et al. | 260—211 R |
| 3,506,642 | 4/1970 | Koh et al. | 260—211 R |

JOHNNIE R. BROWN, Primary Examiner

U.S. Cl. X.R.

424—183